United States Patent [19]

Rabe et al.

[11] Patent Number: 4,764,063

[45] Date of Patent: Aug. 16, 1988

[54] PROCESS AND APPARATUS FOR MACHINING THE RIM OF A HEAD

[75] Inventors: Gerd Rabe, Meinerzhagen; Gerd Pollak, Gummersbach, both of Fed. Rep. of Germany

[73] Assignee: L. & C. Steinmüller GmbH, Gummersbach, Fed. Rep. of Germany

[21] Appl. No.: 840,110

[22] Filed: Mar. 14, 1986

[30] Foreign Application Priority Data

Mar. 14, 1985 [DE] Fed. Rep. of Germany ....... 3509151

[51] Int. Cl.$^4$ .................................................. B23C 1/20
[52] U.S. Cl. .................................. 409/179; 51/241 S; 408/76; 408/237
[58] Field of Search ............... 51/241 R, 241 S, 241 B, 51/245, 281 R; 408/76, 236, 237; 409/179, 175, 178

[56] References Cited

U.S. PATENT DOCUMENTS

| | | | |
|---|---|---|---|
| 2,622,457 | 12/1952 | Buck | 408/76 |
| 3,145,622 | 8/1964 | Rust et al. | 409/178 |
| 3,162,066 | 12/1964 | Morey et al. | 408/76 |
| 3,456,738 | 7/1969 | Harry | 408/76 |
| 3,603,204 | 9/1971 | Anderson | 409/179 |
| 4,462,726 | 7/1984 | Silvey et al. | 408/76 |

*Primary Examiner*—Roscoe V. Parker
*Attorney, Agent, or Firm*—Becker & Becker, Inc.

[57] ABSTRACT

A portable apparatus including a four-legged support that is equipped with adjustable support bases. The apparatus also includes a centering mechanism that includes rotatable eccentric discs, and a modified rotating unit, the rotating arm of which is provided with an adjustment mechanism that is equipped with a sensing device, and with a tracing device that is equipped with various copying templates and is coupled with a machining or processing tool for machining the rim of a flanged, flat, dished semi-ellipsoidal head in preparation for a welding seam connection with a tubular member to produce a circular cylindrical reaction vessel. The apparatus is installed in the upwardly open head coaxial to the axis of the latter. During each rotation of the rotating arm, the machining tool experiences a feed movement and an adjustment movement that is corrected for the geometry of the workpiece or head.

6 Claims, 1 Drawing Sheet

PROCESS AND APPARATUS FOR MACHINING THE RIM OF A HEAD

BACKGROUND OF THE INVENTION

1. Field of the Invention

The present invention relates to a process and an apparatus for machining the rim of a flanged, flat, dished, or semi-ellipsoidal container bottom, head, or end, especially of the bottom of a torispherical head or end, in preparation for a welding seam connection with a tubular member to produce a circular cylindrical reaction vessel.

2. Description of the Prior Art

The machining or processing of the rim of a head having a diameter of 600 to 1,200 mm, and a thickness of up to 12 mm, was for a long time undertaken by manually guided machines.

An object of the present invention is to provide a process, and an apparatus for carrying out such a process, whereby the machining of the rim of a head can be effected exclusively automatically.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
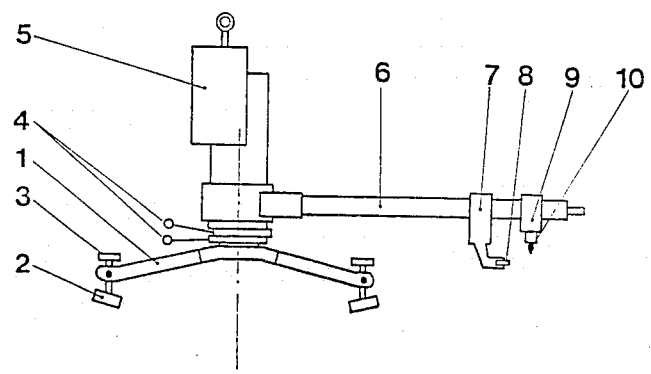
FIG. 1 is an overall view of one exemplary embodiment of the portable apparatus.
Figure 2:
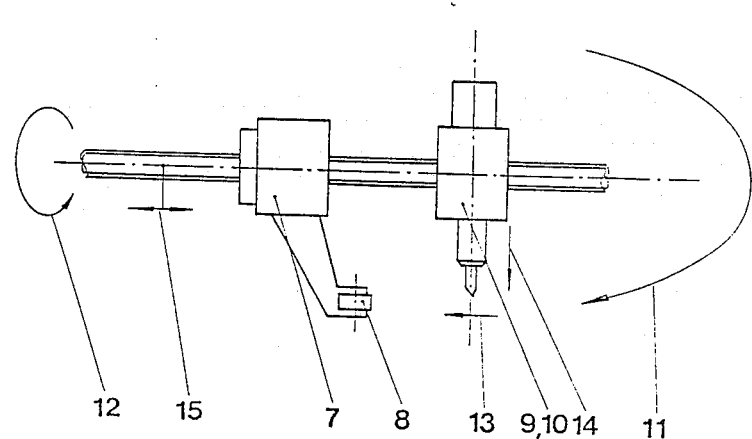
FIG. 2 is a partial view of the inventive apparatus showing the modified rotating arm in conjunction with the various movements.

The inventive process for machining the rim of a head or end includes the steps of: disposing a portable apparatus in the upwardly open head coaxial to the axis of the latter; providing on the rotating arm of the apparatus an adjustment mechanism and a tracing or copying device; coupling a cutting element device with the copying device; while uniformly rotating the rotating arm about the axis of the head, machining the rim of the latter with the cutting or machining tool, whereby the latter, during each rotation of the rotating arm, experiences a feed movement not only in the direction toward the axis of the head and relative to the adjustment mechanism, but also parallel to the axis of the head in the direction toward the rim of the latter; and adjusting the position of the copying device in conformity with the geometry of the rim of the workpiece or head.

The portable apparatus of the present invention is characterized by: a four-legged support, each leg of which is provided with a pivotably mounted support foot or base, the height of which can be adjusted manually; a centering mechanism disposed on the support, with the centering mechanism including two eccentrically mounted members that can be secured to the support in such a way that they are rotatable relative to one another and in common; a rotating unit inserted in the centering mechanism and being provided with a modified rotating arm; a copying or tracing device disposed on the rotating arm, the copying device being provided with a copying arm or template and being coupled with a machining or processing element device, such as a cutting element device; and an adjustment mechanism that is adjustably and movably disposed on the rotating arm, with the adjustment mechanism being provided with a sensing device.

Further features and advantages of the present invention will be described in detail subsequently.

DESCRIPTION OF PREFERRED EMBODIMENTS

Referring now to the drawing in detail, the portable apparatus for processing the rim of the head or end of a receptacle or vessel comprises a standard, internally secured rotating unit 5 (pipe and fusion-face cutter) that is mounted on a four-legged support 1 via centering mechanism 4.

Each leg of the four-legged support 1 is provided with a support base, including a joint connected to the leg, a threaded spindle 3 that is guided in the joint, and a support element 2 that is connected to the threaded spindle.

The support element 2 itself is either an electromagnet, or, in the event that the head is made of an austenitic or non-ferrous material, is a suction-cup-like device that is connected with a vacuum apparatus via a non-illustrated hose system.

The centering mechanism 4 comprises two eccentric rings or discs that can be rotated and secured relative to one another and in common to the four-legged support 1.

The rotating unit 5 is placed in the uppermost eccentric ring, with the drive mechanism for the unit being electrical, pneumatic, or hydraulic. If the drive mechanism is hydraulic or pneumatic, the rotational speed and the torque are set by valves that are manually or electrically actuated. If the drive mechanism is electrical, in contrast, the speed is regulated by a frequency converter (2–100 Hz), and the torque is regulated by limiting the current.

A standard rotating unit (internally secured) is the basis for the special construction:

1. The apparatus is not secured, but rather is set up via its four-legged support, being held either magnetically or by a partial vacuum.

2. Supply line means must be provided for the support element (being electrical lines for magnets if permanent magnets are not used, and being vacuum hoses that must be guided through a bore disposed centrally throughout the entire apparatus).

The rotating unit 5 of the present invention comprises a modified rotating arm 6 that supports a copying or tracing device 9 that is coupled with a cutting element device 10 and can be equipped with various copying arms or templates. The rotating arm is also provided with an adjustment mechanism 7 that is equipped with a sensing device 8. In place of the cutting element device 10, which can be provided with various cutting tools, it is also possible to use other conceivable tools that are adapted to the copying device 9, and are suitable for processing or machining a workpiece, i.e. a head; an example of such a tool would be a grinding tool.

During each rotational movement 11 of the rotating arm 6, the devices located on the rotating arm move variously at the same time. For example, as a result of the rotational movement, a threaded spindle located in the rotating arm receives a partial rotation 12, as a result of which the copying device 9 that is coupled with the cutting element device 10 experiences feed movements 13, 14 not only in the direction toward the axis of the head and relative to the adjustment mechanism, but also parallel to the axis of the head in conformity with the contour of the copying template and the pressure spring in the direction toward the rim of the head.

In the illustrated embodiment, the sensing device 8 of the adjustment mechanism 7 is in the form of a pressure roller via which, during the rotational movement 11 of the rotating arm 6, the geometry of the workpiece or head is detected, and the copying device 9 with its cutting element device 10 is readjusted by means of the movement 15. In so doing, the position of the threaded spindle, the adjustment mechanism, and the copying device relative to one another remains unchanged.

To machine or process the head of a vessel, the portable apparatus must first be readied prior to its installation. This preparation includes adjusting the support feet in conformity to the diameter of the head, selecting magnets or other holding devices for the support feet, preliminarily adjusting the adjustment mechanism and the copying device, and adjusting the axial feed of the rotating unit in the uppermost position.

The thus readied apparatus is now raised via a lifting apparatus to the upwardly open head. Alignment of the apparatus relative to the head is initially effected visually merely by estimating and comparing the distance between the support feet and the rim of the head. Subsequently, the apparatus is fixed to the head by putting into operation the permanent magnets or electromagnets, or activating the vacuum device for the suction-cup-like device.

By determining the distance between the rotating arm and the rim of the head at several locations, the height of the apparatus, via the threaded spindles of the suppor element of the four legs of the support, is manually adjusted in such a way that the apparatus is aligned axis parallel to the head. During the adjustment of the rotating arm to the spacing measurement, as described previously, there is determined at the same time the distance between the two parallel axes of the apparatus and the head. If the axes are spaced from one another, the two eccentric rings or discs are rotated to such an extent and in such a direction relative to one another and to the apparatus until the axes nearly coincide. This correction is effected without having to reinstall the entire apparatus. In addition, slight deviations can be compensated for by the adjustment mechanism, which is equipped with a sensing device.

The adjustment mechanism and the copying device have a specific positioning relative to one another. By rotating a manually actuatable threaded spindle that is located in the rotating arm, and at the same time by securely holding a loosened clamping device in the adjustment mechanism via a tool or by hand, the sensing device is adjusted in such a way that with a movement of the rotating arm, accompanied by simultaneous axial adjustment, the apparatus as a whole rests against the inside of the workpiece or head with constant and sufficient spring stress. In this located position, the adjustment mechanism is fixed on the thread by securing the clamping device. When the threaded spindle is activated, the distance between the adjustment mechanism and the copying device is altered.

The necessary machining tool is now placed in the cutting element device that is coupled with the copying device and is moved into position, i.e. is placed in the starting position of the machining process. In this position, the copying template is secured in conformity with the machining or processing geometry at hand. By further actuating the threaded spindle in the rotating arm for the radial feed of the copying device, the machining tool is moved into the position of greatest machining diameter. The radial feed is effected automatically, and conforms to 0.3 mm per turn of the threaded spindle. The cutting depth is preselected via an axial feed wheel located on the rotating unit.

During rotational movement, the machining or processing tool follows the workpiece, i.e. the head, geometry near the rim of the head via the sensing device, and also follows the contour of the copying template. At the same time, as a result of the rotation of the threaded spindle in the rotating arm, the tool is moved toward or away from the adjustment mechanism.

Where the cutting volume is greater, in other words, where the thickness of the material is greater, the machining process may have to be repeated several times, with resetting being done manually.

The number of revolutions of the apparatus depends upon the machining diameter. If a machining or processing tool of HSS (high tension steel or high-speed cutting steel or metal) is used, the cutting speed is 8–12 m/min. With a head having a diameter of 1,200 mm, the number of revolutions is calculated as follows: (at a cutting speed of 12 m/min)

$$R = (12,000/1,200 \ x) \simeq 3.2 \ min^{-1}$$

or (at a cutting speed of 8 m/min)

$$R = (8,000/12,000 \ x) \simeq 2.2 \ min^{-1}$$

If a hard metal cutting tip is used, the optimum cutting speed is between 80 and 120 m/min, corresponding to 22 to 32 revolutions of the apparatus per minute.

The present invention is, of course, in no way restricted to the specific disclosure of the specification and drawing, but also encompasses any modifications within the scope of the appended claims.

What we claim is:

1. A process for machining the rim of a flanged, flat, dished, or semi-ellipsoidal head in preparation specifically for a welding seam connection with a tubular member to produce a circular cylindrical reaction vessel; said process includes the steps of:
   disposing a portable apparatus in the upwardly open head coaxial to an axis of the latter, said portable apparatus having an arm extending perpendicular to said axis and being rotatable about said axis;
   providing on said rotating arm of said apparatus an adjustment mechanism and a copying device;
   coupling a machining element with said copying device;
   while uniformly rotating said rotating arm about the axis of said head, machining the rim of the latter with said machining element, whereby said machining element, during each rotation of said rotating arm, experiences feed movements not only in the direction toward the axis of said head and relative to said adjustment mechanism, but also parallel to the axis of said head in the direction toward the rim of the latter; and
   adjusting the position of said copying device in conformity with the geometry of the rim of said head.

2. A process according to claim 1, which includes the step of providing a cutting element device as said machining element.

3. A portable apparatus for machining the rim of a flanged, flat, dished or semi-ellipsoidal head in preparation for a welding seam connection with a tubular member to produce a circular cylindrical reaction vessel; said apparatus comprises:
- a four-legged support, each leg of which is provided with a pivotably mounted support base, the height of which can be adjusted manually;
- a centering mechanism that is disposed on said support and includes two eccentrically mounted members that can be secured to said support in such a way that they are rotatable relative to one another and in common;
- a rotating unit that is inserted in said centering mechanism and is provided with a modified rotating arm;
- a copying device that is disposed on said rotating arm, is provided with a copying template, and is coupled with a machining element; and
- an adjustment mechanism that is adjustably and movably disposed on said rotating arm; said adjustment mechanism is equipped with a sensing device.

4. An apparatus according to claim 3, in which each of said support bases of said support legs is provided with an electromagnet.

5. An apparatus according to claim 3, in which each of said support bases of said support legs is provided with a suction-cup-like device.

6. An apparatus according to claim 3, in which said machining element is in the form of a cutting element device.

* * * * *